Feb. 22, 1966

E. E. CHAPIN ET AL 3,235,930

AUTOMATIC SEAT BELT RELEASE

Filed Nov. 15, 1963

Everett E. Chapin
Ivan L. Bishop
INVENTORS

BY Clarence A. O'Brien
and Harvey B. Jacobson
Attorneys

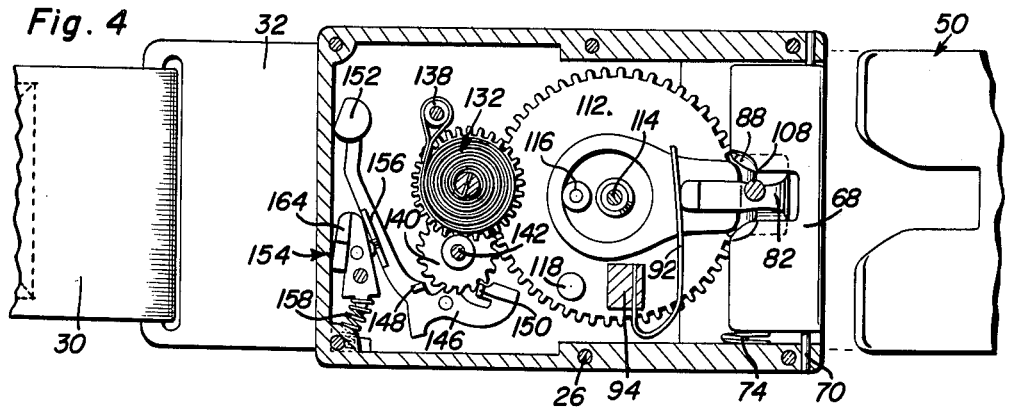
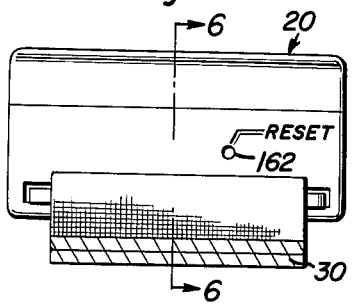
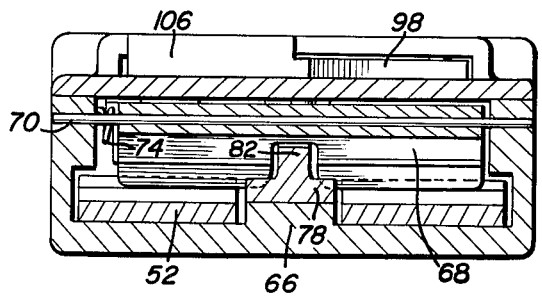
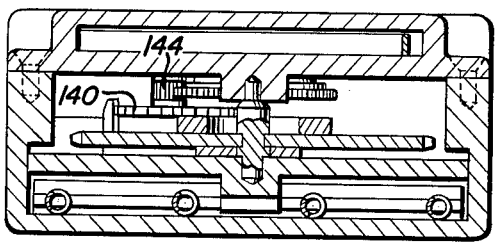
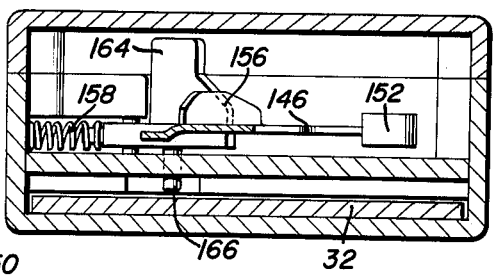
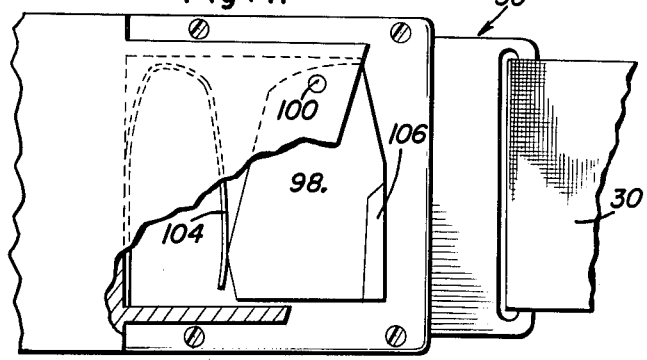
Everett E. Chapin
Ivan L. Bishop
INVENTORS

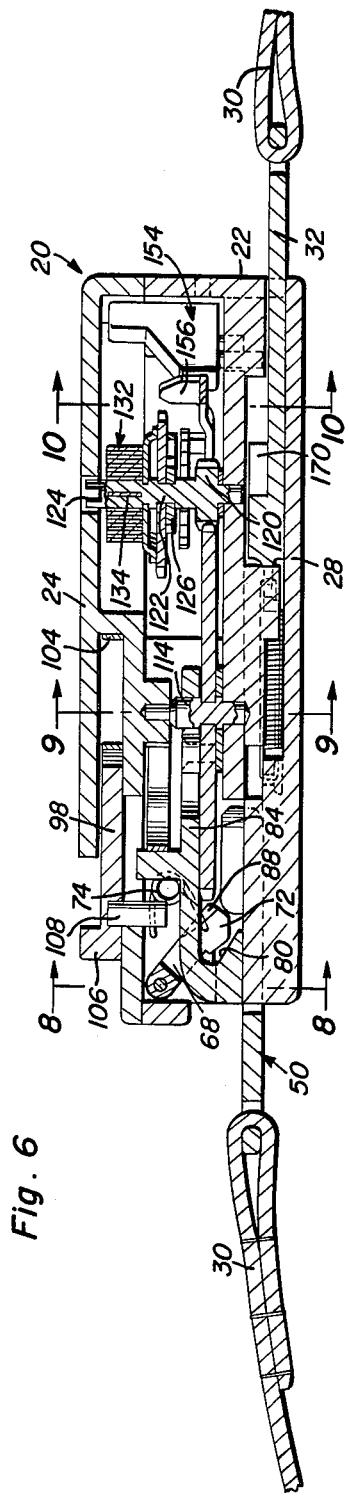

United States Patent Office 3,235,930
Patented Feb. 22, 1966

3,235,930
AUTOMATIC SEAT BELT RELEASE
Everett E. Chapin, Placerville, and Ivan L. Bishop, West Sacramento, Calif., assignors of one-third to Marvin A. McNabb, Eldorado, Calif.
Filed Nov. 15, 1963, Ser. No. 323,938
7 Claims. (Cl. 24—230)

The present invention is generally concerned with seat belts, and more specifically relates to a novel seat belt buckle including both manual and automatic release means.

While the advantages of seat belts in moving vehicles of all types is undisputed, a significant problem arises in effecting the release of such belts after an accident when access to the release, normally positioned on the buckle, cannot be had due to either the user being incapacitated or various obstructions physically intervening with actual contact with the belt buckle. Accordingly, it is a primary object of the instant invention to provide, in conjunction with a manual release for engagement and disengagement of the belt in a convenient manner, an automatic release means for effecting a release of the seat belt in response to a sudden impact, this automatic release being delayed for a predetermined time after impact deemed sufficient so as to insure that movement of the vehicle has ceased.

In conjunction with the above object, it is also an object of the instant invention to provide that the release means, both manual and automatic, be incorporated completely within the buckle structure.

Also, it is an object of the instant invention to provide an automatic release belt buckle wherein it will be immediately apparent to the user of the seat belt whether or not the belt is properly locked and the automatic release set.

Furthermore, it is an object of the instant invention to provide an automatic seat belt release which is relatively simple in construction, trouble-free in operation, and compact so as to be conveniently incorporated into the buckle structure.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a view similar to FIGURE 2, however, illustrating the device in its unlocked position through the action of the automatic release;

FIGURE 5 is an elevational view of one end of the buckle;

FIGURE 6 is an enlarged vertical cross-sectional view taken substantially on a plane passing along line 6—6 in FIGURE 5, illustrating the device in its locked position;

FIGURE 7 is a cross-sectional view similar to FIGURE 6 illustrating the device in its unlocked position;

FIGURE 8 is a cross-sectional view taken substantially on a plane passing along line 8—8 of FIGURE 6;

FIGURE 9 is a cross-sectional view taken substantially on a plane passing along line 9—9 in FIGURE 6;

FIGURE 10 is a cross-sectional view taken substantially on a plane passing along line 10—10 in FIGURE 6;

FIGURE 11 is a partial top plan view of the buckle with a portion broken away so as to illustrate the manual lever and the biasing spring therefor; and FIGURE 12 is a perspective view of the belt hook which is releasably inserted into the buckle.

Figure 1:
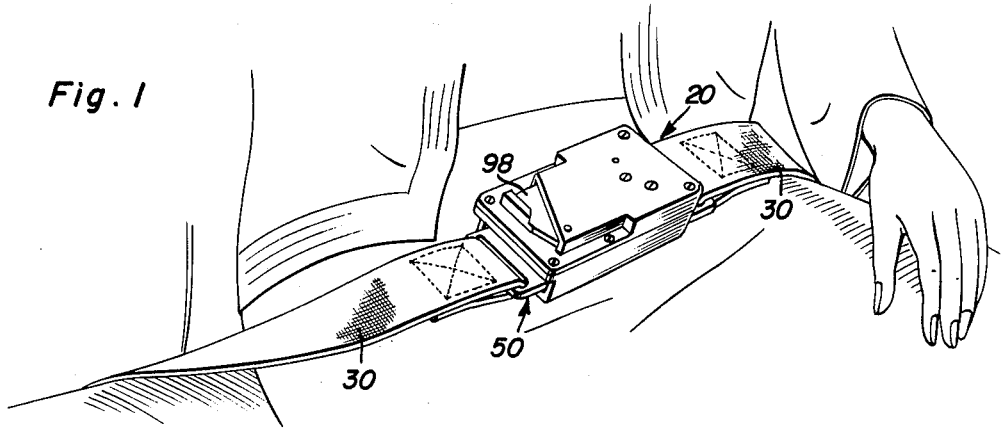
FIGURE 1 is a perspective view illustrating a seat belt utilizing the instant invention.

Referring now more specifically to the drawings, reference numeral 20 is used to generally designate the seat belt buckle within which the release mechanisms of the instant invention are mounted. The buckle 20 consists basically of a two-piece housing including a base section 22 and a top section 24 suitably secured, as by screws or rivets 26, to the base portion 22. It will be noted that the base portion 22 includes a planar lower surface 28 so as to engage comfortably against the body of a user in the manner illustrated in FIGURE 1.

One end of the seat belt 30 is fixedly secured, as by stitching in the conventional manner, to the outer end of a belt receiving means in the form of a flat plate 32. This plate 32 is inserted through a transverse slot 34 in a first end of the buckle 20 and into an enlarged chamber 36 in the base 22. The inner end of the plate 32 includes a vertical projection 38 which limits the sliding movement of the plate 32 within the chamber 36 between an outer position wherein the projection 38 engages against the abutment wall 40 forming the forward portion of the chamber 36, and a rear position wherein an abutment 42 depending into the chamber 36 is engaged by a rearwardly extending abutment portion 44 on the projection 38. The plate 32 is spring biased to its inward position by means of a plurality of tension springs 46 having one end engaged through a narrowed rearwardly projecting flange 48 on the plate 32 and the other end fixed to the base 22 at the rear of the chamber 36.

The opposite end of the seat belt 30 is fixedly secured to the belt hook 50, this belt hook 50 being in the form of a flat plate bifurcated at one end so as to form two generally parallel legs 52 which in turn have the facing edges thereof diverging at the forward ends of the legs 52 as generally indicated by reference numeral 54. In addition, each of the legs 52 includes, on the forward portion thereof, an upwardly projecting latch engaging enlargement 56, these enlargements 56 each including beveled forward and rearward upper edges 58 and 60.

The belt hook 50 is inserted into the buckle 20 through a transversely elongated slot 62 provided through the front of the base 22 into a second chamber 64 with the insertion of the hook 50 being guided by a centrally located guide bar 66 projecting upwardly from the bottom of the chamber 64 centrally thereof, the legs 52 of the hook 50 being positioned on opposite sides of the member 66 with the rounded edges 54 facilitating the centering of the hook 50 on this member 66.

In order to secure the belt hook 50 within the housing 20, a latch 68, extending approximately the full width of the chamber 64, is pivotally mounted at the upper forward edge thereof by an elongated rod 70 which has the opposite ends thereof fixed to the side walls of the housing 20. The latch 68 extends downwardly and rearwardly from the rod 70 and is bifurcated much in the same manner as the hook 50 with each furcation having a depending enlargement or projection 72 thereon, these projections in turn having angled abutment faces whereby engagement is had with the belt hook enlargements 56 of an inserted belt hook 50 so as to prevent its withdrawal prior to a raising of the latch 68. The latch 68 is biased into its downward position, as illustrated in FIGURE 6, by means of a coiled resilient spring 74 having one end fixed to the side wall of the housing and the other end fixed to the latch 68 adjacent the free end thereof.

A release member 76 is provided for raising the latch member 68 so as to allow a withdrawal of the belt hook 50, such a raising of the latch 68 also being necessary prior to an insertion of the belt hook 50 as shall be described presently. The release member 76 includes a camming portion 78 slidable on the guide bar 66 for the hook furcations 52. This camming portion 78 is wider than the space between the latch furcations and includes a beveled upper edge 80 engageable with the latch enlargments 72 for an upward pivoting of the latch 68 upon an inward or rearward movement of the camming portion 78. The camming portion 78 is integrally secured to a relatively narrow upwardly arced portion 82 which extends between the latch furcations and is in turn integral with a flat laterally enlarged body portion 84 which includes an enlarged circular aperture 86 through the rearward portion of the body portion 84.

Figure 2:
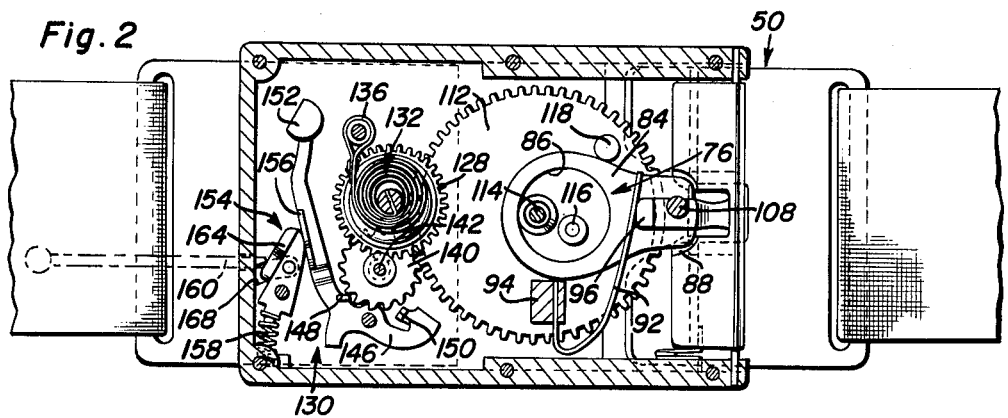
FIGURE 2 is an enlarged horizontal top plan view of the buckle with the upper portion removed and illustrating the device in its locked position.
Figure 3:
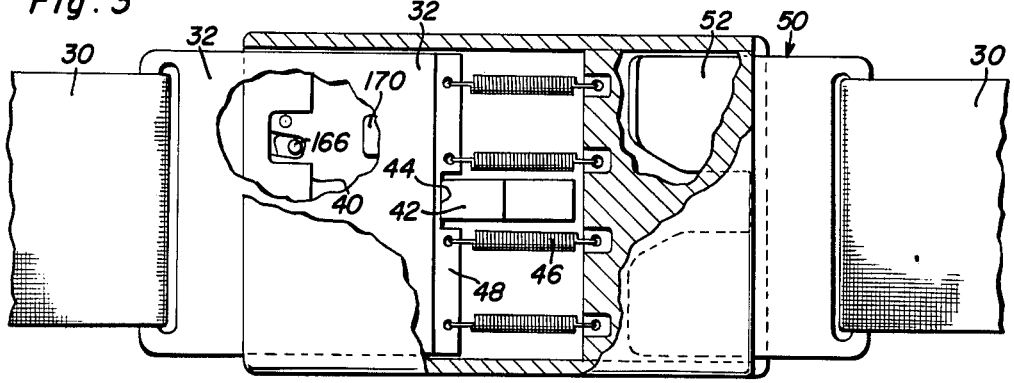
FIGURE 3 is a bottom plan view of the device with portions broken away for purposes of illustration.

The body portion 84, as will be noted in FIGURE 2, laterally overlaps the upper edge portions of the adjoining latch furcations, these upper edge portions being beveled as indicated by reference numeral 88 with the corresponding lower surface portions of the body portion 84 being similarly beveled, note that portion indicated by reference numeral 90 in FIGURE 7, whereby the surfaces 90 engage against the surfaces 88 when the release member 76 is in its forward position and the latch 68 is in its down or locking position thus preventing upward movement of the latch 68. As the release member 76 is moved rearwardly, the surfaces 90 move away from the surfaces 88 and the camming surfaces 80 engage the lower surfaces of the latch furcations and move the latch 68 upward toward its unlocked position.

The release member 76 is normally maintained in its forward position by a biasing leaf spring 92 having one end fixed to a depending portion 94 of the top 24 and the other end engaged against an integral upwardly projecting stud 96 on the body portion 84 in a manner so as to urge this stud 96, and consequently the release member, forwardly. The instant invention contemplates the use of both manual and automatic means so as to effect a rearward movement of the release member 76 and consequently an unlocking of the latch 68.

The manual means for moving the release member 76 consists of a flat lever 98 pivotally mounted by a pin 100 for sliding movement on the top portion 24, this top portion including a recess 102 into which the lever 98 moves and which contains, between the inner end of the recess 102 and the inner edge of the lever 98, a biasing leaf spring 104 continuously urging the lever 98 to its outermost position. A vertically projecting finger tab 106 is provided on the outer end of the lever 98, this tab, in addition to facilitating a movement of the lever 98, also acting as a limit for the inward pivotal movement of the lever 98. In order to activate the member 76, a depending lug 108 is affixed to the lever 98 and extends downwardly through an elongated slot 110 for engagement with the stud 96 on the release member 76 whereby an inward pivoting of the lever 98 against the spring 104 engages the lug 108 against the stud 96 and causes an inward movement of the release member 76 against its biasing spring 92 thereby effecting an upward pivoting of the latch 68. Incidentally, it will be noted that the lug 108 provides a limit, when engaged against the end of the slot 110, for the outward movement of the lever by its spring 104. As will be appreciated, upon a release of the lever 98, the lever 98 is returned to its original outward position by the spring 104, the release member 76 is returned to its original outward position by the spring 92, and the latch 68 is returned to the locking position by the spring 74 and maintained in this locking position by engagement of the edges 90 with the edges 88.

The means for automatically withdrawing the latch 68 includes an enlarged toothed wheel 112 rotatably mounted at its center on a vertically projecting pin 114 which extends through the circular aperture 86 in the release member 76, this pin 114 being juxtaposed the rearmost portion of the circular aperture 86 when the release member 76 is in its forwardmost position as illustrated in FIGURES 2 and 6. In addition, a camming pin 116 is fixed to and projects upwardly from the wheel 112 at a point between the pin 114 and the periphery of the wheel 112, this camming pin 116 also projecting into the circular aperture 86. Referring to FIGURES 2 and 4, it will be noted that the camming pin 116 is oriented so as to, as the wheel 112 is moved in a counterclockwise direction from the initial position illustrated in FIGURE 2 wherein the release member 76 is forward to a second position wherein the release member 76 is drawn inwardly so as to release the latch as shown in FIGURE 4, progressively engage the periphery of the circular aperture 86 causing a progressive inward movement of the release member 76 as the rearmost portion of the aperture 86 is moved rearwardly away from the pin 114 with the rotational movement of the wheel 112 being limited by the stop 118 projecting upwardly therefrom and being engageable with the projection 94.

The wheel 112 is driven by means including a gear 120 fixed to a vertically extending shaft 122 rotatably mounted within the housing 20 and having a slotted head 124 accessible through the top 24 of the housing 20. Also mounted on the shaft 122 by means of a one-way clutch structure 126 is an enlarged gear 128 meshed with an escapement mechanism 130. Also fixed to the shaft 122 and providing the rotational driving means therefor is a coiled main spring 132 having the inner end 134 thereof fixed to the shaft 122 and the outer end 136 thereof engaged about a post 138 fixed to the housing at a point spaced radially outward from the gear 128. Accordingly, when the wheel 112 is to be automatically rotated, the spring 132 is tightened by rotating the shaft 122 counterclockwise using a screwdriver inserted into the slotted head 124 of the shaft 122, a locking means being provided in conjunction with the escapement means so as to retain the automatic release means in a set position, the escapement means itself regulating the speed of rotation of the wheel 12 and in effect providing a timing mechanism for providing a predetermined time delay between the start of the rotation of the wheel 112 and the release of the latch 68.

The escapement or timer means includes an escapement wheel 140 fixed to a vertically extending rotatably mounted shaft 142 located outwardly from the outer periphery of the gear 128 and including a reduced gear 144 thereon drivingly meshed with the gear 128. In addition to the escapement of wheel 140, the escapement mechanism 130 includes an escapement lever 146 including spaced lugs 148 and 150 selectively engageable with the teeth on the escapement wheel 140 so as to regulate the movement thereof, and a weight 152 on the outer end of the lever 146 with this weight determining the oscillatory frequency of the lever 146 and consequently the speed of rotation of the escapement wheel 140 and thereby the speed of the wheel 112, it of course being appreciated that by varying the weight 152 the speed will also be varied. As such, it will be recognized that the escapement mechanism 130 operates basically by the alternate engagement of the lugs 148 and 150 so as to in effect step the escapement wheel 140 about its axis.

In order to lock the automatic release mechanism in its set or loaded position, a pivotally mounted dog lug 154 is provided, this lug 154 being positionable in abutting engagement with an upstanding flange 156 on the lever 146 so as to hold the lever 146 inwardly with the lug 148 engaged with the teeth of the wheel 140 so as to prevent a rotation of the wheel. Until the lug 154 is withdrawn no rotation of the wheel 140 is possible thus enabling a step by step tightening of the spring 132, the one-way clutch 126 allowing the rotation of the shaft 122. A compression spring 158 is anchored to the housing corner at one end with the other end engaged about a rearwardly projecting stub on the lug 154, the longitudinal axis of the spring 158 being off-center relative to the pivot point of the lug 154 so as to maintain the lug 154 in either of its rotated positions, either engaged with the flange 156 or withdrawn therefrom. Engagement of the lug 154 is accomplished by means of an elongated tool, which may be in the form of a conventional nail 160, this tool being inserted through an aperture 162 into abutting engagement with a flange 164 on the lug 154 for pushing the lug 154 into engagement with the flange 156 which in turn engages the lug 148 with the wheel 140. It will be noted that this hole 162 has been labeled "RESET" in FIGURE 5, it being contemplated that this indicia appear on the finished product.

In order to pivot the lug 154 rearwardly, a depending stub 166 is fixed thereto and projects downwardly therefrom into the chamber 36 through an elongated slot 168 where this stub 166 is engaged by an abutment means 170 projecting upwardly from the upper surface of the plate 32 upon an outward movement of this plate 32 against the biasing force of the springs 46. It will of course be appreciated that the abutment 170 will only contact the lug 166 upon the introduction of a sufficient tensile pull on the plate 32 necessary so as to cause an elongation of the springs 46 a predetermined amount. After the member 154 has been moved out of engagement with the lever 146, the automatic release mechanism is free to operate and, after a predetermined time, the release of the belt hook 50 occurs.

From the foregoing, it should now be readily apparent that the highly novel belt buckle has been defined, this belt buckle incorporating, completely within the buckle, both a manual and an automatic release. With reference to the manual release, it will be noted that this release is both extremely simple and very convenient to operate requiring, if anything even less effort to operate than a conventional safety belt release. The automatic release becomes operative after the introduction of a predetermined tension in the belt, such as would result from a forward movement of a passenger upon impact, the particular amount of tension needed being adjustable by merely varying the number of strength of the springs 146. Once the automatic release commences operation, a timer or escapement means provides a predetermined time delay before an actual release of the belt is effected so as to provide sufficient time for the vehicle to come to a stop, this time delay also being variable as described supra. Another significant safety feature of the buckle results from the fact that the belt hook cannot be engaged within the buckle when the latch is in its locking position, thus, when one attempts to insert the belt hook into the buckle and finds no resistance to this insertion, he is immediately advised that the automatic release has not been set. Once the automatic release mechanism is set, the user of the belt must retract the latch with the manual release to insert the hook. As described in detail supra, the automatic device is set by throwing the lug 154 off-center with a tool inserted through the reset hole, and subsequently winding the spring 132 using a screwdriver engaged with the slotted upper end 124 of the shaft 122.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A seat belt buckle mountable on one end of a seat belt for releasable reception of a seat belt hook mounted on the other end of the seat belt for providing a body encircling safety device, said buckle including a housing, a belt receiving means fixed within the housing and projecting from a first end thereof, a transversely extending belt hook slot through the second end of said housing, a latch means pivotally mounted within the housing, positioning means for maintaining the latch means in a first locking position for preventing withdrawal of an inserted belt hook and for pivoting said latch means into an unlocked position, externally accessible manual lever means mounted on the housing, said manual lever means being engageable with said positioning means for selectively moving the latch means to an unlocked position so as to release an inserted belt hook, and second release means mounted within the housing and engageable with said positioning means for selectively moving the latch means to the unlocked position, said second release means being automatically operable for effecting a moving of the latch means upon the subjecting of the belt receiving means to a predetermined tensile force.

2. The device of claim 1 wherein said second release means includes a timing mechanism for providing a predetermined time delay between the introduction of the tensile force and the moving of the latch means.

3. The device of claim 2 wherein said latch means, in the locking position, prevents insertion of the belt hook.

4. The device of claim 2 wherein said belt receiving means is slidably mounted within the housing, a first step means limiting the inward movement of the belt receiving means relative to the housing, a second stop means limiting the outward movement of the belt receiving means, and means resiliently biasing the belt receiving means inwardly against the first stop means.

5. The device of claim 2 wherein said positioning means includes a release member slidably mounted within the housing, said release member including a face thereon engageable with the latch means for movement of the latch means to the unlocked position, means biasing the release member away from the latch means, said manual lever means being engageable with the release member for moving said release member against the release member biasing means, said release member being returnable by its biasing means to its original position upon release of the manual lever means.

6. The device of claim 5 wherein said second release means is engageable with the release member for moving said release member against the release member biasing means and fixing said release member in its moved position.

7. The device of claim 6 wherein said second release means includes an enlarged wheel rotatably mounted at its center, a camming pin fixed to and projecting laterally from one surface of the wheel at a point between the center and the periphery thereof, and means for causing an automatic rotation of said wheel, said timing mechanism regulating the rotational movement of said wheel, said camming pin being engageable with the release member for effecting the moving of the release member upon a rotation of the wheel.

References Cited by the Examiner

UNITED STATES PATENTS 3,142,102 7/1964 Saunders _____ 24—230.1
3,146,846 9/1964 Gutshall _____ 24—230.1 X

FOREIGN PATENTS 1,315,413 12/1962 France.
1,317,765 1/1963 France.

WILLIAM FELDMAN, *Primary Examiner.*